United States Patent Office 2,735,095
Patented Feb. 21, 1956

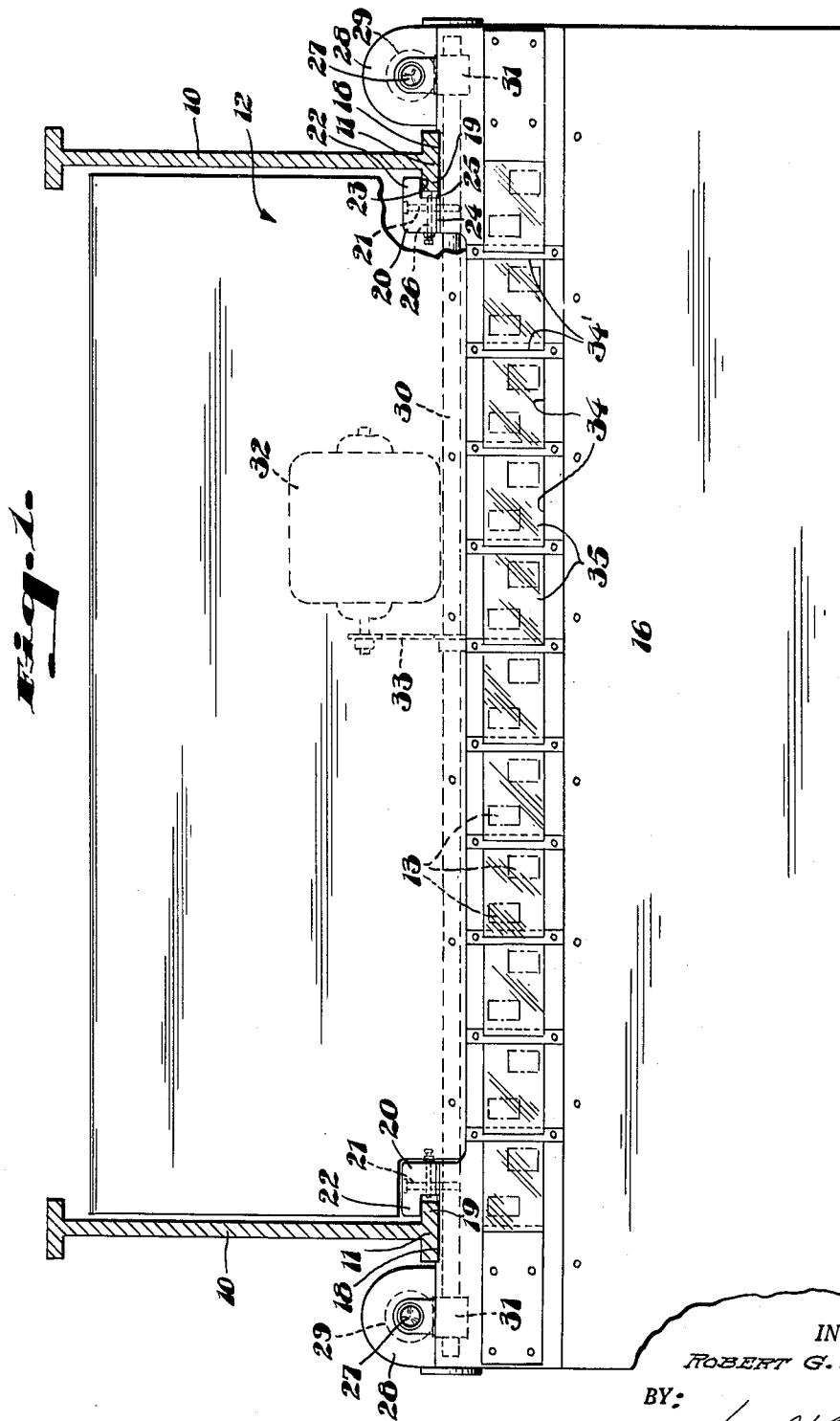

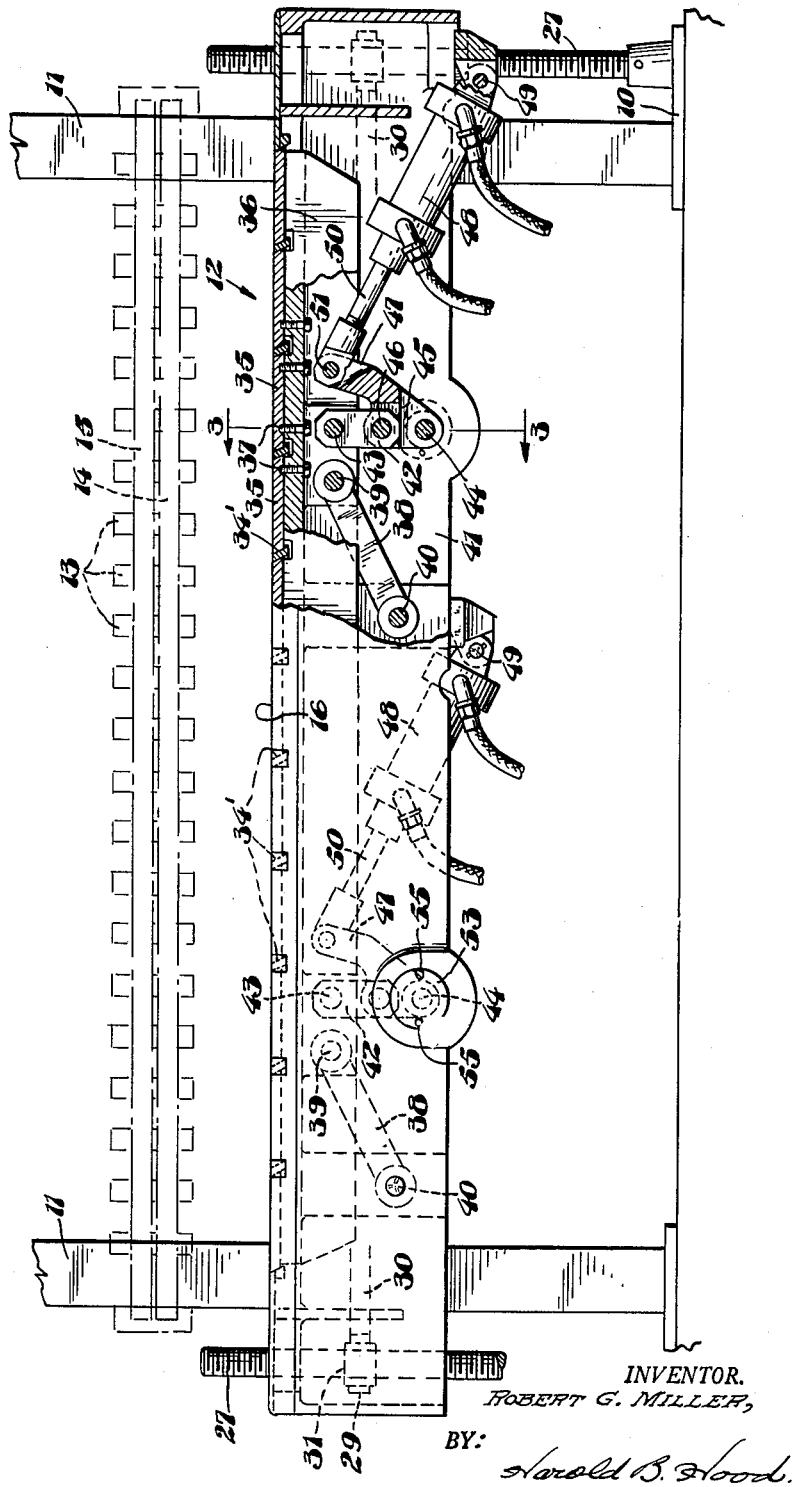

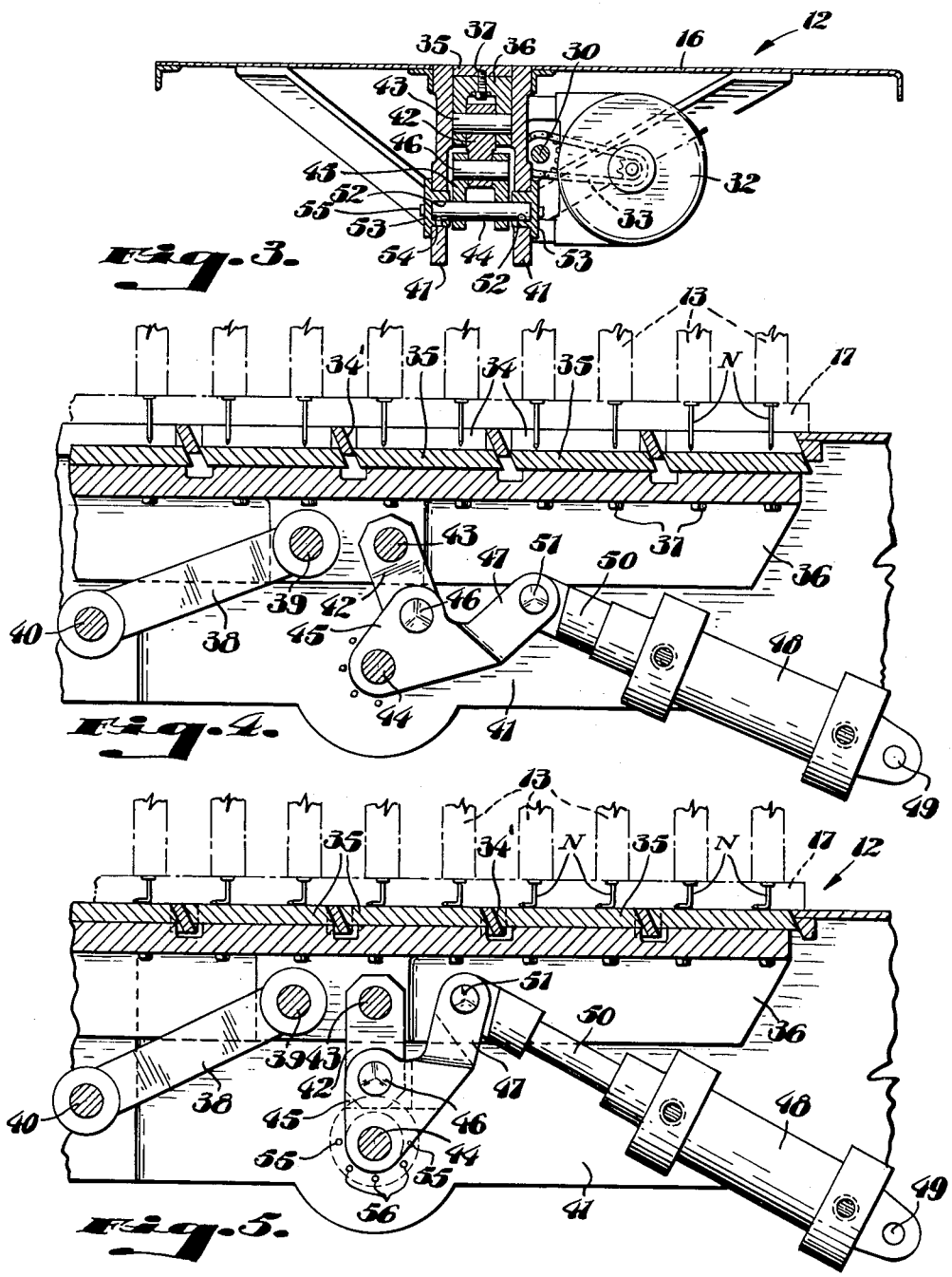

2,735,095

NAIL CLINCHER MECHANISM

Robert G. Miller, Wabash, Ind., assignor to The G. M. Diehl Machine Works, Inc., Wabash, Ind., a corporation of Indiana Application February 17, 1954, Serial No. 410,914

10 Claims. (Cl. 1—15)

The present invention relates to a nailing machine and particularly to mechanism in such a machine for clinching the nails after they have been driven into and through the work-piece by the machine.

In the machine with which my invention is primarily concerned, a frame carries a table providing a substantially horizontal upper surface on which a work-piece is supported. A plurality of mechanisms is carried on the frame above the table and such mechanisms are movable simultaneously toward the table into engagement with the work-piece to hold it solidly against the upper surface thereof. Thereafter, such mechanisms are actuated to drive one nail each into and through the work-piece. It is the primary object of this invention to provide means supported entirely from the table and operable, after the nails have been driven through the work, to clinch the nails against the under side of the work-piece.

There are certain types of non-clinching nailing operations which can be performed by the machine resulting, in one instance, from the thickness of the work-piece exceeding the length of the nail being used. Under such conditions, it becomes necessary to render the clincher mechanism inoperative, and to adjust the machine to accommodate the thickness of the work-piece. It is a further object of my invention to provide means for supporting the table carrying the clincher mechanism on the machine frame in such a way as to render it easily adjustable vertically, and further, to provide motive-means for the clincher mechanism entirely independent of the machine frame so that it can be easily rendered operative or inoperative regardless of the position of the table on the machine frame.

Another object is to provide mechanism for supporting and guiding the table on the machine frame of such character as to be readily adjustable to compensate for wear caused by such movement of the table on the machine frame.

The clinching mechanism is supported upon bearings carried by the table and, due to the extreme forces required to actuate the clincher mechanism, the bearings will become worn resulting in improper functioning of the mechanism. Another object of my invention is, therefore, to provide means whereby the bearings can be manipulated to compensate for such wear, thereby postponing the need for bearing replacement.

Further objects will become apparent as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a plan view of the table of the nailing machine showing the clincher mechanism associated therewith;

Fig. 2 is a front elevation of the table of Fig. 1, parts being broken away to show the details of the clincher mechanism;

Fig. 3 is a transverse sectional view taken substantially on line 3—3 of Fig. 2 and showing further details of the clincher mechanism;

Fig. 4 is a view similar to the right-hand showing of Fig. 2, but drawn to an enlarged scale, showing the clincher mechanism in the position it assumes when the nails are driven through the work-piece; and Fig. 5 is a view similar to Fig. 4 but showing the clincher mechanism after it is moved to its position for clinching the nails.

Referring more particularly to the drawings, it will be seen that the machine comprises a frame 10 providing a pair of spaced, substantially vertical tracks or rail members 11, 11. A work-supporting table, referred to generally by the reference numeral 12, is supported on frame 10 in a manner hereafter to be described.

A plurality of nail-applying mechanisms 13 is supported on bars 14 and 15 spanning the machine frame above table 12 and, since their particular construction is not here of importance, it will suffice to say that such mechanisms are operable to be moved toward the upper surface 16 of table 12 and into engagement with the work-piece 17 supported thereon (see Figs. 4 and 5) to hold the work solidly against the upper table surface. Thereafter, mechanisms 13 are actuated to drive one nail each into and through the work-piece. At that moment, my clinching-mechanism is actuated to clinch the nails against the under side of the work-piece. It is this mechanism with which my invention is concerned.

The table 12 is formed to provide a pair of vertical surfaces 18, 18 (Fig. 1) arranged to be held in sliding contact with the rails 11. Each rail is provided with a lip portion 19 projecting toward the opposite rail. A shoe member 20 is secured adjacent each table surface 18, by means of screws 21 or the like, and is rabbeted along one edge to provide a lip 22 overlying the surface 18 to define a channel 23 opening toward the adjacent rail 11. The rail lip 19 on each rail is adapted to be received in one of the channels 23. In order to adjust the spacing of lip 22 from the rail lip 19, I provide a laminated shim 24 between the shoe member 20 and the table 12. Any wear which occurs due to the movement of table 12 along the rails 11 can be compensated for by the reduction in the thickness of shim 24.

To permit initial adjustment and subsequent compensation for wear between the edge of lips 19 and the bottom of channels 23, I provide a pressure bar 25 for each channel 23 adapted to be held in sliding engagement with lip 19. These bars are supported in their respective channels by means of one or more adjustment screws 26 threadedly received through tapped bores in the shoe members 20. By axial adjustment of screws 26, proper clearance can be maintained between the pressure bars 25 and the lip 19. Thus, the table 12 can be maintained at all times in extremely accurate sliding adjustment on rails 11, a condition found to be extremely desirable, if not essential, to the proper functioning of my clincher mechanism.

To provide for vertical adjustment of table 12, I provide a pair of screw shafts 27 non-rotatably supported in frame 10 near the opposite ends of table 12. Each shaft is received in suitable bearings 28 carried by said table and a worm-wheel 29 is axially confined in each of such bearings and threadedly received on each shaft 27.

A shaft 30 spans table 12 and is provided with a worm-gear 31 at each end thereof meshing with the respective worm-wheels 29. A reversible electric motor 32 is supported from table 12 and is drivingly connected to shaft 30 by means of the sprocket and chain drive 33, or the like. Actuation of motor 32 in one direction will rotate worm-wheels 29 in a direction to raise table 12. Actuation of the motor in the opposite direction will, of course, lower table 12. The current position of table 12 is selected, primarily, to accord with the thickness of the work 17 currently being processed through the machine.

Registering with the nail-applying mechanisms 13, I provide apertures 34 through the upper table surface 16. In the illustrated embodiment of my invention, I have formed these apertures by first providing an elongated opening through the table 16 beneath the mechanisms 13. I then provide a plurality of bar members 34' spanning this opening to define the individual apertures 34. The purpose of the bars 34' is, of course, to provide support for the work-piece 17, where it lies across the opening in the table, to sustain most of the pressure exerted by mechanisms 13 in driving the nails through the work-piece. Without such support, the pressure, in some instances, would be sufficient to crush the work-piece.

My clincher mechanism comprises a plate 35 enterable in each of said apertures. My invention involves the concept of lowering the plates 35 in apertures 34 while the nails N are being driven through work-piece 17 (see Fig. 4); and of thereafter moving the plates upward and, at the same time, side-ways until said plates are flush with the table surface 16. This combined movement of the plates tends to bend the nails in a common direction (see Fig. 5) and to embed them in the back of the work-piece.

To accomplish such movement of plates 35, I provide a carrier member 36 spanning table 12 beneath apertures 34. Such member is here shown in the form of an inverted U-shaped channel; the plates 35 being secured to the base of the channel by means of screws 37, or the like.

A pair of substantially parallel links 38 each have one end pivoted to an axle 39 spanning the sides of the member 36 for swinging movement of the links about substantially parallel axes substantially parallel to the upper table surface 16. The opposite end of each link is pivoted upon an axle 40 spanning a pair of side flange members 41 depending from table 12. It will be noted in Fig. 3 that the carrier member 36 is guided between flanges 41.

The links 38 are inclined with respect to the upper table surface 16. Downward movement of member 36 will result, therefore, in side-wise movement of plates 35 so that the plates will actually travel along paths inclined with respect to table surface 16, but in a direction opposite to the inclination of links 38.

While the movement of plates 35 is not necessarily great, the force which must be applied by the plates to effect clinching of the nails is necessarily great. In order that such extreme force be had without the need for exceedingly large motor means, I have provided a linkage assembly which will deliver the necessary force to plates 35 through the application of a relatively smaller force to such assembly.

At points spaced along carrier member 36, I provide a first link 42 having one end pivotally supported upon an axle 43 spanning the sides of member 36 upon an axis substantially parallel to the axes of the links 38. A second axle 44 spans the table flanges 41, substantially parallel to axle 43 and lying substantially in a vertical plane including the axis of axle 43. A link 45 is pivoted at one end on axle 44 and is pivotally connected at the other end, as at 46, to the other end of link 42. The combined lengths of links 42 and 45 is such that when said links are in substantial alignment, the plates 35 on carrier 36 will lie substantially flush with the upper table surface 16.

Link 45 is provided with an arm 47 projecting laterally therefrom and extending upward toward table surface 16, past pivot point 46. A fluid motor has its cylinder 48 pivotally anchored to table flanges 41, as at 49, and the piston rod 50 is pivotally connected to the distal end of arm 47, as at 51. As compared to the degree of movement of plates 35, the motor 48 has a relatively long stroke. Due to the specific linkage between the motor and the carrier 36 however, a very great mechanical advantage is obtained which results in far less movement of plates 35 but with greatly increased power.

Because of the enormous concentration of force against the plates 35, it will be recognized that the bearings in the various pivotal connections will be subjected to extreme wearing stresses. After enough wear has occurred, it will be impossible for the plates 35 to return to their position flush with table surface 16. When this happens, the nails N will not be clinched sufficiently to embed them in the underside of the work-piece as shown in Fig. 5.

One way to correct the wear in the bearings is, of course, to replace them when the wear becomes too great for proper functioning of the mechanism. This, however, is an expensive and time consuming procedure. To compensate for bearing wear and to greatly postpone the need for replacement of the bearings, I have supported the ends of axle 44 in bores 52 formed in bearings 53. These bearings are received in aligned bores 54 in the table flanges 41. To accomplish my purpose, I have formed the bores 52 in the bearings 53 slightly eccentric with respect to the bores 54 in table flanges 12. Bearings 53 are removably secured in the table flange bores by means of screws 55. A plurality of tapped bores are provided in the table flanges surrounding bores 54 into which screws 55 can be selectively received.

When bearing wear occurs in an amount sufficient to need repairing, it is necessary only to remove screws 55, rotate the bearing 53 an amount sufficient to return plates 35 flush with table surface 16, and to replace the screws in others of the tapped bores 56. After the bearings 53 have been rotated through 180° from their illustrated positions, subsequent wear will, of course, necessitate replacement of the bearings.

I claim as my invention:

1. In a nailing machine comprising a frame, a table carried on said frame and providing a substantially horizontal upper surface for supporting a work-piece, and means carried on said frame above said table and movable toward said table into engagement with said work-piece to hold said work-piece solidly against said upper surface and to drive a nail into and through said work-piece, said upper table surface having an aperture therethrough registrable with said nail to permit said nail to project below said upper table surface, the combination of means for clinching said nail against the underside of said work-piece comprising a plate enterable in said aperture, means carried by said table and supporting said plate for movement thereof along a path inclined with respect to said upper table surface between a position spaced downward from said upper surface and a position substantially flush with said upper surface, and means drivingly connected to the last-said means for so moving said plate between such positions.

2. In a nailing machine comprising a frame, a table carried on said frame and providing a substantially horizontal upper surface for supporting a work-piece, and means carried on said frame above said table and movable toward said table into engagement with said work-piece to hold said work-piece solidly against said upper surface and to drive a nail into and through said work-piece, said upper table surface having an aperture therethrough registrable with said nail to permit said nail to project below said upper table surface, the combination of means for clinching said nail against the underside of said work-piece comprising a plate enterable in said aperture, means carried by said table and supporting said plate for movement thereof along a path inclined with respect to said upper table surface between a position spaced downward from said upper surface and a position substantially flush with said upper surface, and means drivingly connected to the last-said means for so moving said plate between such positions, said means supporting said plate comprising a carrier member arranged beneath the aperture in said upper table surface with said plate fixed thereto, and a pair of spaced, substantially parallel link members inclined with respect to said upper table surface and pivotally connected at one end of each to said carrier member for swinging movement about substantially parallel axes substantially parallel to said uper table surface, and pivotally connected at the other ends of each to said table for swinging movement about axes substantially parallel to the first-mentioned axes.

3. The device of claim 2 in which the said means for moving said plate along said inclined path comprises a first link pivotally connected at one end to said carrier member, a second link pivotally connected at one end to said able and at the other end to the other end of said first link, and motor means supported from said table and operably connected to one of said links to move said links toward and away from parallelism with each other.

4. In a nailing machine comprising a frame, a table carried on said frame and providing a substantially horizontal upper surface for supporting a work-piece, and means carried on said frame above said table and movable toward said table into engagement with said work-piece to hold said work-piece solidly against said upper surface and to drive a nail into and through said work-piece, said upper table surface having an aperture therethrough registrable with said nail to permit said nail to project below said upper table surface, the combination of means for clinching said nail against the underside of said work-piece comprising a plate enterable in said aperture, means carried by said table and supporting said plate for movement thereof along a path inclined with respect to said upper table surface between a position spaced downward from said upper surface and a position substantially flush with said upper surface, and means drivingly connected to the last-said means for so moving said plate between such positions, said table with its associated clincher mechanism being vertically adjustable on said frame, said frame including a pair of spaced, substantially vertical rail members each having a lip projecting toward the opposite rail member, and said table including means providing a pair of oppositely opening channels each adapted to receive one of said lips, and including a pressure member disposed in each of said channels adjacent the lip therein, and means carried by said channel-providing means and engageable with the respective pressure members to hold such members in sliding engagement with the adjacent rail lip.

5. The device of claim 4 in which the last said means comprises a plurality of screws for each of said channel-providing means threadedly received through tapped bores in said means and engaging said pressure members for adjusting said members toward and away from the respective rail lips.

6. The device of claim 4 in which said table is provided with a pair of vertically arranged surfaces engageable each with one of said rail members, said channel-providing means each comprising a shoe member secured to said table adjacent one of said surfaces and substantially parallel thereto, said shoe member having a rabbet formed along one edge thereof to define a lip overlying the lip of the adjacent rail member, and a layer of laminated shim stock interposed between said shoe member and said table for maintaining a predetermined clearance between said rail lip and the lip of the associated shoe member.

7. In a nailing machine comprising a frame, a table carried on said frame and providing a substantially horizontal upper surface for supporting a work-piece, and means carried on said frame above said table and movable toward said table into engagement with said work-piece to hold said work-piece solidly against said upper surface and to drive a plurality of nails into and through said work-piece, said upper table surface having a plurality of apertures therethrough registrable with said nails to permit said nails to project below said upper table surface, the combination of means for clinching said nails against the underside of said work-piece comprising a plurality of plates enterable each in one of said apertures, means carried by said table and supporting said plates for simultaneous movement thereof along substantially parallel paths inclined with respect to said upper table surface between positions spaced downward from said upper surface and positions substantially flush with said upper surface, and means drivingly connected to the last-said means for so moving said plates between such positions.

8. In a nailing machine comprising a frame, a table carried on said frame and providing a substantially horizontal upper surface for supporting a work-piece, and means carried on said frame above said table and movable toward said table into engagement with said work-piece to hold said work-piece solidly against said upper surface and to drive a plurality of nails into and through said work-piece, said upper table surface having a plurality of apertures therethrough registrable with said nails to permit said nails to project below said upper table surface, the combination of means for clinching said nails against the underside of said work-piece comprising a plurality of plates enterable each in one of said apertures, means carried by said table and supporting said plates for simultaneous movement thereof along substantially parallel paths inclined with respect to said upper table surface between positions spaced downward from said upper surface and positions substantially flush with said upper surface, and means drivingly connected to the last-said means for so moving said plates between such positions, said means supporting said plates comprising a carrier member spanning said table beneath the said apertures in the upper surface thereof and with said plates fixed thereto, and a pair of spaced, substantially parallel link members inclined with respect to said upper table surface but opposite to the paths of movement of said plates, one end of each of said links being pivotally connected to said carrier member for swinging movement about substantially parallel axes substantially parallel to said upper table surface, and the opposite end of each of said links being pivotally connected to said table for swinging movement about axes substantially parallel to the first-mentioned axes.

9. The device of claim 8 in which said means for moving said plates along said inclined paths comprises a first link pivotally connected at one end to said carrier member for swinging movement about an axis substantially parallel to said upper table surface, a second link pivotally connected at one end to said table for swinging movement about an axis substantially parallel to the said axis of said first link but spaced downward therefrom, means providing a pivotal connection betweenn the other ends of said first and second links, and motor means supported from said table and operably connected to one of said links to move said links toward and away from parallelism with each other.

10. The device of claim 9 in which said motor means comprises a fluid motor having a fixed portion and a reciprocable element, said fixed portion being supported on said table and said reciprocable element being pivotally connected to one of said links upon an axis substantially parallel with the axes upon which said first and second links are pivotally connected to said carrier member and to said table, respectively.

(References on following page)

References Cited in the file of this patent

UNITED STATES PATENTS

| | | |
|---|---|---|
| 536,192 | Doig | Mar. 26, 1895 |
| 593,232 | McAllister et al. | Nov. 9, 1897 |
| 861,382 | Milliken | July 30, 1907 |
| 1,020,436 | Morgan | Mar. 19, 1912 |
| 1,842,796 | Morgan | Jan. 26, 1932 |
| 1,903,700 | Kruse | Apr. 11, 1933 |
| 2,544,499 | Hovey | Mar. 6, 1951 |
| 2,546,398 | Kamborian | Mar. 27, 1951 |
| 2,686,911 | Richards | Aug. 24, 1954 |

FOREIGN PATENTS

| | | |
|---|---|---|
| 115,898 | Australia | Sept. 18, 1942 |